US 8,576,751 B2

(12) United States Patent  
Hoffmann et al.

(10) Patent No.: US 8,576,751 B2  
(45) Date of Patent: Nov. 5, 2013

(54) METHOD, MOBILE STATION, SYSTEM AND NETWORK PROCESSOR FOR USE IN MOBILE COMMUNICATIONS

(75) Inventors: Torben Hoffmann, Horsholm (DK); Lars Sorensen, Brondby Strand (DK)

(73) Assignee: Motorola Solutions, Inc., Schaumburg, IL (US)

( * ) Notice: Subject to any disclaimer, the term of this patent is extended or adjusted under 35 U.S.C. 154(b) by 262 days.

(21) Appl. No.: 13/122,083

(22) PCT Filed: Sep. 17, 2009

(86) PCT No.: PCT/US2009/057302  
§ 371 (c)(1),  
(2), (4) Date: Mar. 31, 2011

(87) PCT Pub. No.: WO2010/039445  
PCT Pub. Date: Apr. 8, 2010

(65) Prior Publication Data  
US 2011/0182214 A1  Jul. 28, 2011

(30) Foreign Application Priority Data  
Oct. 2, 2008 (GB) .................................. 0818027.5

(51) Int. Cl.  
*H04L 12/06* (2006.01)

(52) U.S. Cl.  
USPC .......................................... 370/277; 455/411

(58) Field of Classification Search  
USPC ............... 455/411; 380/248; 713/155; 726/9  
See application file for complete search history.

(56) References Cited

U.S. PATENT DOCUMENTS

| 5,241,598 | A * | 8/1993 | Raith ........................... 380/248 |
| 2003/0097584 | A1 | 5/2003 | Haukka et al. |
| 2004/0015692 | A1 | 1/2004 | Green et al. |
| 2004/0029576 | A1 | 2/2004 | Flykt et al. |
| 2004/0157585 | A1 * | 8/2004 | Sashihara ..................... 455/411 |
| 2009/0286483 | A1 * | 11/2009 | Kanemoto et al. ........... 455/66.1 |
| 2009/0313466 | A1 * | 12/2009 | Naslund et al. ............... 713/155 |
| 2011/0191842 | A1 * | 8/2011 | Lindholm et al. ................ 726/9 |

FOREIGN PATENT DOCUMENTS

| GB | 2304497 A | 8/1995 |
| GB | 2400273 A | 5/2003 |
| WO | 9923836 A1 | 5/1999 |
| WO | WO2006073673 A2 * | 7/2006 |

OTHER PUBLICATIONS

PCT International Search Report Dated Apr. 30, 2010.  
Great Britian Search Report Dated Dec. 30, 2008.

(Continued)

*Primary Examiner* — Asad Nawaz  
*Assistant Examiner* — Parth Patel  
(74) *Attorney, Agent, or Firm* — Barbara R. Doutre; Daniel R. Bestor

(57) ABSTRACT

A method (200) of operation in a mobile communication system (100) includes:
  a mobile station (101) sending (207) to a visited network (103) a certified service record, provided by a home network (102), of communication services allowed to be provided to the mobile station, the service record being accompanied by or including a certificate code applied by the home network by a calculation procedure applied to contents of the service record using an authentication key;
  the visited network calculating (211) an authentication code for the service record using an authentication key obtained by the visited network;
  the visited network authenticating (212) the service record by matching (212) the certificate and authentication codes; and
  the visited network providing (215) communication services to the mobile station based upon the authenticated service record.

11 Claims, 2 Drawing Sheets

(56) References Cited

OTHER PUBLICATIONS

International Preliminary Report on Patentability and Written Opinion for counterpart International Application No. PCT/2009/057302, mailed on Apr. 14, 2011.

Supplementary European Search Report for counterpart European Patent Application No. 09818221, completed on Dec. 18, 2012.

Long, M., et al., "Localised authentication for inter-network roaming across wireless LANs," WLAN systems and interworking, Lee Proceedings, Communications, vol. 151, No. 5, Oct. 2004, pp. 496-500.

Li, G., et al., "A Novel Localized Authentication Protocol in 3G-WLAN Integrated Networks," (ICEE), 2010 International Conference on E-Business and E-Government, pp. 1285-1288.

"Terrestrial Trunked Radio (TETRA); Voice plus Data (V+D); Part 7: Security; Draft ETSI EN 300 392-7," V3.0.3, Nov. 1, 2007, pp. 93, Part 1.

"Terrestrial Trunked Radio (TETRA); Voice plus Data (V+D); Part 7: Security; Draft ETSI EN 300 392-7," V3.0.3, Nov. 1, 2007, pp. 93, Part 2.

\* cited by examiner

METHOD, MOBILE STATION, SYSTEM AND NETWORK PROCESSOR FOR USE IN MOBILE COMMUNICATIONS

CROSS REFERENCE TO RELATED APPLICATIONS

This application is a National Stage filing under 35 USC §371 of co-pending Patent Cooperation Treaty international application having Serial No. PCT/US09/57302 (the "PCT international application") filed on 17 Sep. 2009. This application claims priority to the PCT international application and to prior Great Britain (GB) national application having Serial No. 0818027.5 filed on 2 Oct. 2008, the priority of which was also claimed in the PCT international application. Both the PCT international application and the GB national application are assigned to MOTOROLA SOLUTIONS, Inc.

FIELD OF THE INVENTION

The present invention relates to a method, a mobile station, a system and a network processor for use in mobile communications. In particular, the invention relates to establishing provision of communication service to a mobile station able to migrate between different communication networks.

BACKGROUND OF THE INVENTION

A cellular or trunked communication system is one in which mobile or portable user terminals, such as mobile telephones or portable or vehicle mounted radios, herein collectively referred to as 'mobile stations' or 'MSs', can communicate via a system infrastructure which generally includes one or more fixed base stations (base transceiver stations) and other routing and control installations. Each base station has one or more transceivers and serves MSs in a given region or area known as a 'cell' by wireless communication. The cells of neighbouring base stations are often overlapping.

A mobile communication system providing wide area coverage may be considered as being formed of a plurality of interlinked networks. Each network normally includes a group of cells often referred to as a 'zone'. The infrastructure of each network usually comprises, in addition to the base stations which serve the mobile stations in the respective cells of the zone, a router (which may also be referred to as a switch) which routes communications to and from the network and within the network. The router may be associated with, or form part of, a zone controller which may provide other management functions within the network, such as providing management of the base stations on a network level. The infrastructure may also include an authentication processor which authenticates and registers MSs to use the network. The networks of different zones, particularly the routers and authentication processors of those networks, may communicate by various known means such as radio or microwave communication, hard wired electrical or optical communication, or the internet.

It is usual for a MS of a particular user registered with a mobile system operator to have a 'home' network which normally provides a communication service to the user. If the user moves to another region not covered by the home network, e.g. to a different part of the user's country or to a foreign country, it is still possible for the user to receive a service from the local network as a visited network. An authentication process involving the user's home network and the visited network usually needs to be completed satisfactorily together with registration of the visiting MS by the visited network.

For example, one particular type of mobile communication system widely used in Europe and elsewhere to support communications within organisations such as public safety services and enterprises is a TETRA system. Such a system is one designed to operate in accordance with the TETRA (Terrestrial Trunked Radio) standard procedures or 'protocol' defined by the European Telecommunication Standards Institute (ETSI). Generally, TETRA systems support migration of MSs from a home network to a visited network and provision of communication services in the visited network. Another system which is designed for use in a similar manner is an APCO 25 system which is a system operating according to the APCO 25 standard defined by the Association of Public Safety Communications Officials International (APCO), standardized by the US Telecommunications Industry Association (TIA).

Usually, when a MS requests registration by a visited network, the particular services to be provided to the MS need to be determined by the visited network during the authentication and registration procedure. In known systems, the services to be provided are determined by the visited network obtaining from the home network a service record giving details of the services allowed to be provided to the MS. The services may vary from MS to MS, depending for example on the particular implementation of the MS or on the organisation department or seniority within the organisation or department of the user of the MS. Usually, the visited network provides services which are in line with those allowed in the home network and are specified by the home network when queried by the visited network. Communication between the visited network and the home network of information relating to the allowed services is thus required in known systems. Authentication and registration of the MS by a visited network can be undesirably delayed by the need for such communication, especially where a number of MSs have migrated and requested registration together.

Furthermore, no registration may be possible at all if there is a failure in a communication link between the networks.

SUMMARY OF THE INVENTION

According to the present invention in a first aspect there is provided a method of operation in a mobile communication system, the method being as defined in claim 1 of the accompanying claims.

According to the present invention in a second aspect there is provided a system, the system being as defined in claim 13 of the accompanying claims.

According to the present invention in a third aspect there is provided a mobile station as defined in claim 15 of the accompanying claims.

According to the present invention in a fourth aspect there is provided a processor for use as an authentication processor in a home network of a mobile communication system, the processor being as defined in claim 16 of the accompanying claims.

According to the present invention in a fifth aspect there is provided a processor for use as an authentication processor in a visited network of a mobile communication system, the processor being as defined in claim 17 of the accompanying claims.

Further features of the invention are defined in the accompanying dependent claims and are disclosed in the description of embodiments of the invention given later herein.

DESCRIPTION OF EMBODIMENTS OF THE INVENTION

Figure 1:
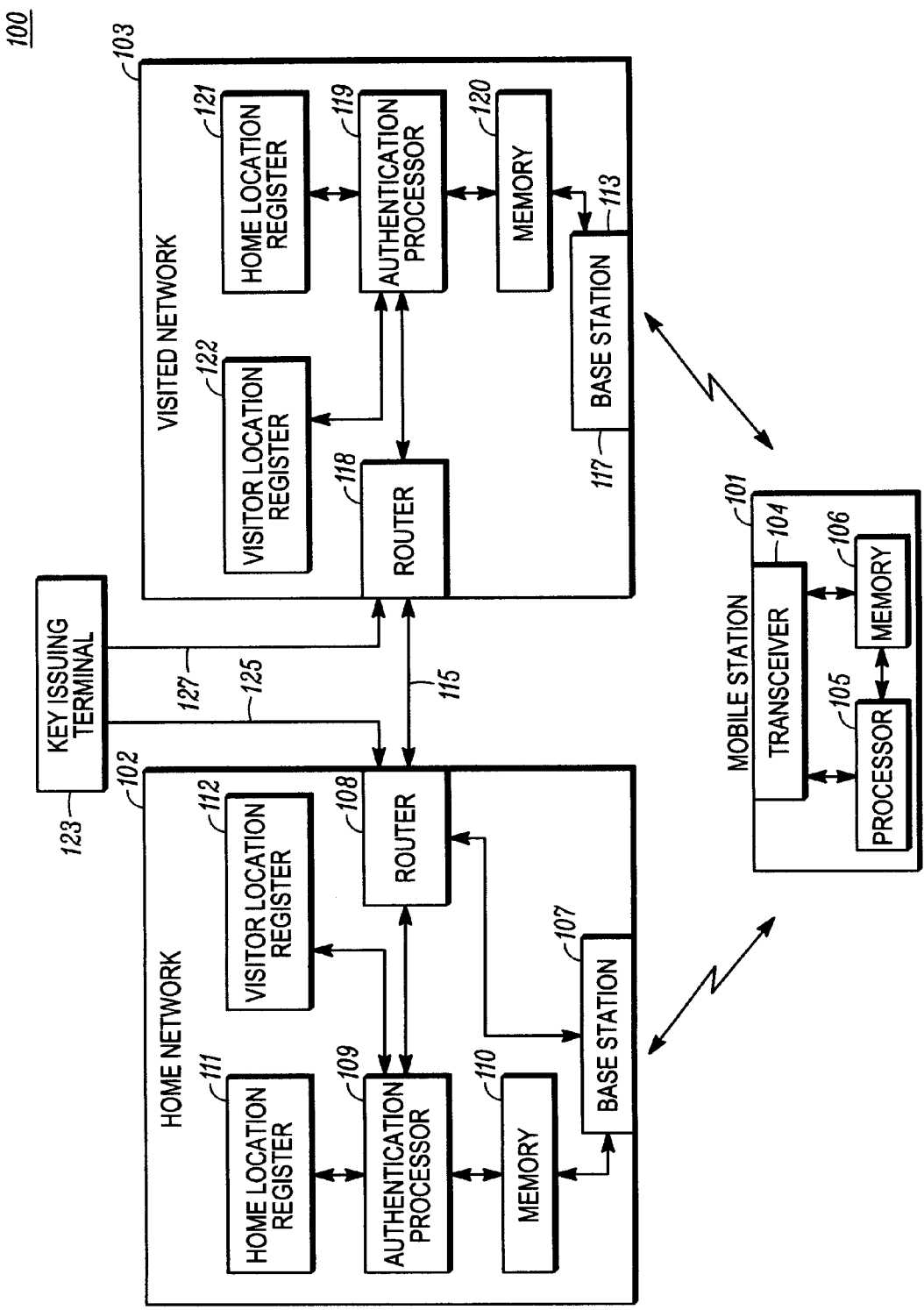
FIG. 1 is a block schematic diagram of a mobile communication system in which embodiments of the invention may be applied.

FIG. 1 is a block diagram showing an illustrative mobile communication system 100 in which embodiments of the invention may be applied. For simplicity, only basic components of the system 100 are shown in FIG. 1. The system 100 includes a MS (mobile station) 101 and two networks 102, 103. The system 100 may include other MSs and other networks (not shown). The network 102 is the home network of the MS 101 and the network 103 is a visited network, i.e. another network from which the MS 101 is able to obtain communication services when within the vicinity of the network 103 and when an authentication and registration procedure between the network 103 and the MS 101 has taken place.

The MS 101 includes as main components (together with other components not shown) an RF transceiver 104 and a central processor 105 which controls functional operations in the MS 101 and is operationally coupled to the transceiver 104. The MS 101 also includes a memory 106 operationally coupled to the processor 105 and to the transceiver 104. The memory 106 includes stored data and programs needed in operation by the processor 105 and the transceiver 104.

The home network 102 includes a base station 107 which includes one or more transceivers providing wireless communication with the transceiver 104 of the MS 101 when the MS 101 is within range of the base station 107. The home network 102 also includes: (i) a router 108 for routing communications into and out of the network 102 and within the network 102; (ii) an authentication processor 109 which carries out authentication and registration functions of the home network 102; an (iii) a memory 110 which stores data and programs needed in operation by the home network 102, especially by the authentication processor 109. The authentication processor 109 is operably coupled to a home location register 111 which is a database holding data relating to mobile stations normally served by the network 102 as home network. The authentication processor 109 is also operably coupled to a visitor location register 112 which is a database holding data relating to mobile stations normally served by networks other than the network 102 as home network and which have visited the network 102.

The registers 111 and 112 are shown in FIG. 1 to be within the home network 102 although they could alternatively be outside the home network 102 but operably linked to the home network 102.

The authentication processor 109 and/or the router 108 may be associated with, or incorporated within, a zone controller (not shown) of the home network 102.

As will be apparent to those skilled in the art, the home network 102 may include further interconnected components (not shown) such as further base stations and further routers.

The visited network 103 includes a base station 113 which includes one or more transceivers providing wireless communication with the transceiver 104 of the MS 101 when the MS 101 is within range of the base station 113 and authentication and registration of the MS 101 by the network 103 has been successfully completed, as described later. The visited network 103 also includes: (i) a router 118 for routing communications into and out of the network 103 and within the network 103; (ii) an authentication processor 119 which carries out authentication and registration functions of the visited network 103; and (iii) a memory 120 which stores data and programs needed in operation by the network 103, especially the authentication processor 119.

The authentication processor 119 is operably coupled to a home location register 121 which is a database holding data relating to mobile stations normally served by the network 103 as a home network. The authentication processor 119 is also operably coupled to a visitor location register 122 which is a database holding data relating to mobile stations normally served by networks other than the network 103 as home network and which have visited the network 103.

The registers 121 and 122 are shown in FIG. 1 to be within the visited network 103 although they could alternatively be outside the visited network 102 and operably coupled to the network 103.

The authentication processor 119 and/or the router 118 may be associated with, or incorporated within, a zone controller (not shown) of the visited network 103.

As will be apparent to those skilled in the art, the visited network 103 may include further interconnected components (not shown) such as further base stations and further routers.

A two-way link 115 may exist between the home network 102 and the visited network 103 to enable communications to be made when required between the two networks. The link 115 may be formed in one of the ways known in the art as referred to earlier. It may thus be a wired or cable link or a wireless link.

The system 100 also includes a key issuing terminal 123. One purpose of the terminal 123 is to issue a MAC (message authentication code) key to the networks 102 and 103. The terminal 123 may also issue a MAC key to other networks (not shown) and/or may issue other keys, such as keys required in encrypted communications to and from mobile stations, to the networks 102 and 103 (and other networks). The MAC key issued by the terminal 123 enables a certificate code, referred to herein as a 'MAC' (Message Authentication Code), to be calculated and applied in relation to a service record issued by the home network 102 for the MS 101 (or any other MS for which the network 102 is home network) as described later. The certified service record including the MAC calculated using the service record, is provided to and stored by the relevant MS, e.g. the MS 101. The certified service record may later be communicated to the visited network 103 by the MS 101 and, as described later, an authentication code, a MAC intended to be the same as that calculated by the home network 102, may be calculated by the visited network 103 using the same MAC key and calculation procedure as used by the home network 102 to authenticate the service record.

The MAC key issued by the key issuing terminal 123 to different networks may conveniently be the same key, although different MAC keys may be issued to different networks as home networks. Each network such as the network 102 may conveniently use the same MAC key for use in connection with certifying the service records of all MSs served by the network as home network. Each network could, however, receive from the key issuing terminal 123 and use different MAC keys for the service records of different MSs, or different groups of MSs, served by the network as home network.

The key issuing terminal 123 may issue a fresh MAC key to the home network 102 and the network 103 periodically, e.g. after a given period of time, e.g. a fixed number of weeks, since the issue of the previous MAC key. Alternatively, or in addition, the key issuing terminal 123 may issue a fresh MAC key after a trigger event, e.g. after part or all of the system 100, or one of the links in the system 100, e.g. the link 115, has been restored to operation after a period of failure.

The key issuing terminal 123 is connected to the home network 102 by a link 125 and to the visited network 103 by a link 127. Each of the links 125 and 127 may be a wired or cable link or a wireless link. The MAC key is sent to the networks 102 and 103 by the links 125 and 127 respectively.

When the home network 102 receives the MAC key from the key issuing terminal 123 via the link 125, it stores the key in its memory 110. When the visited network 103 receives the MAC key from the key issuing terminal 123 via the link 127, it stores the key in its memory 120.

When each of the networks 102 and 103 receives and stores each fresh MAC key, it preferably retains in storage in its memory the earlier key(s) which the fresh key replaces, so that the network is able to carry out the required calculation procedure using the earlier key if necessary, e.g. as described later with reference to FIG. 2. The network 102 also preferably updates the MAC code of the service record for each of the MSs that it serves as home network as soon as possible after receiving the fresh MAC key.

The key issuing terminal 123 is shown in FIG. 1 to be outside the networks 102 and 103 although the terminal 103 could alternatively be incorporated within one of the networks, e.g. within the home network 102, or distributed between the networks 102 and 103.

Figure 2:
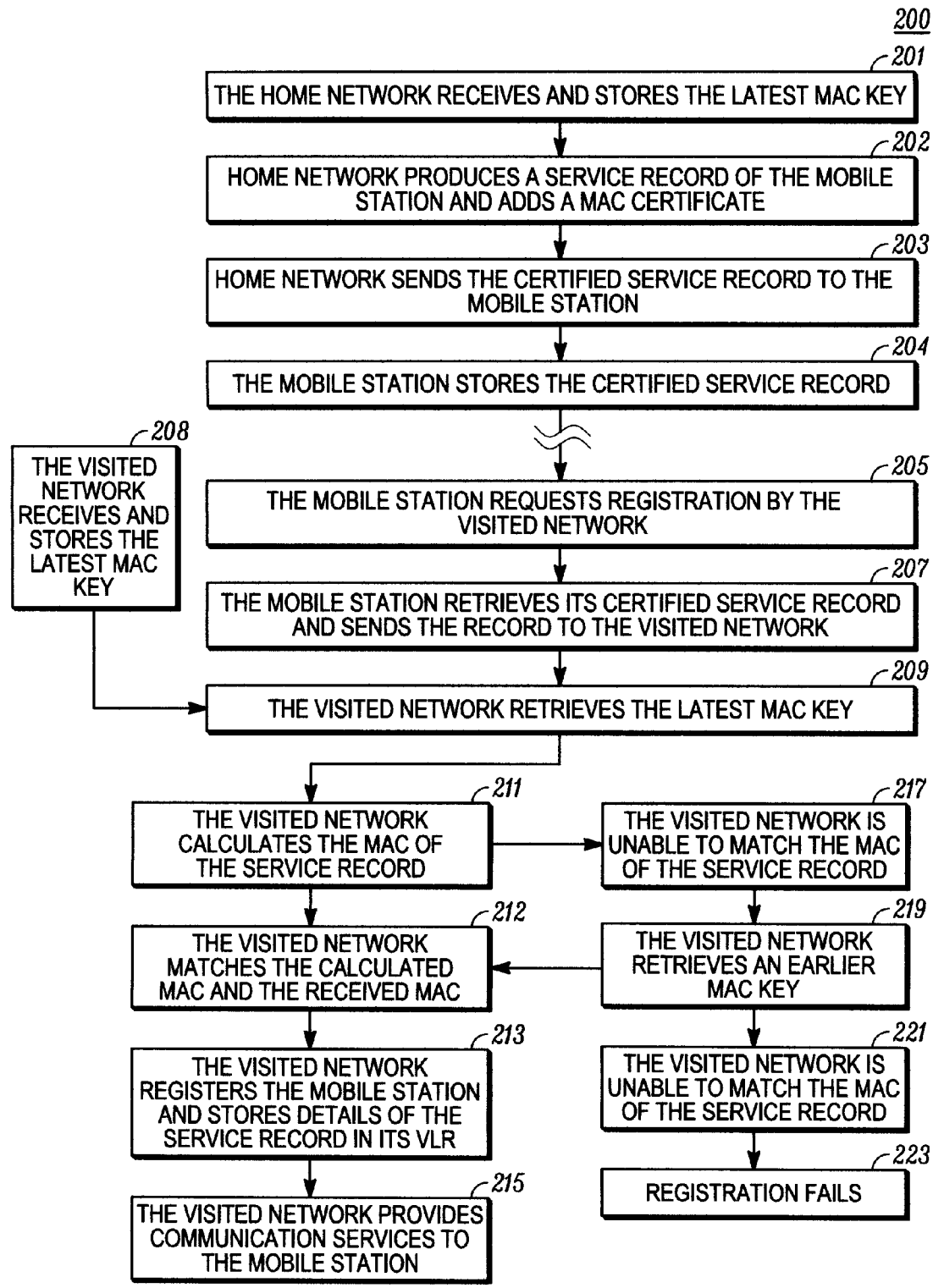
FIG. 2 is a flow diagram of a method embodying the present invention for use in the system of FIG. 1.

FIG. 2 is flow diagram illustrating a method 200 embodying the invention which may be used in the system 100.

In a step 201 of the method 200, the home network 102 receives via the link 125 the latest MAC key issued by the key issuing terminal 123 and stores the key in its memory 110.

In a step 202, the home network 102 produces a service record of the MS 101 and adds a MAC (certificate code) to the service record. The authentication processor 109 may produce the service record by use of current service record data obtained from the home location register 111. The service record may be produced as an updated record whenever the service record held in the home location register 111 is updated and/or whenever a given period of time has passed, e.g. a fixed number of weeks, since the previous issue of the service record, and/or whenever a trigger event occurs, e.g. whenever the MS 101 registers with the home network 102. Furthermore, the MAC of the service record may be updated by re-calculation whenever a fresh MAC key has been received from the key issuing terminal 123. The service record may thus be updated whenever the MAC is re-calculated.

The service record produced in step 202 includes data relating to details of the services which the MS is permitted to receive in the system 100 from networks of the system 100 including the home network 102 and the visited network 103. Examples of such data included in the service record may include:

(i) System access permission: this indicates that the MS 101 and/or its current authorised user is allowed to use the system 100 for mobile communications;

(ii) Individual interconnect capability: this indicates whether the MS 101 is allowed to participate in interconnected calls taking place within the system 100;

(iii) Half/full duplex capability: this indicates whether the MS 101 is allowed to participate in half or full duplex calls within the system 100;

(iv) Encryption capability: this indicates whether the MS 101 is allowed to transmit or receive encrypted wireless communications and the level or type of encryption security to be applied;

(v) Priority level; this indicates what priority level is allowed for calls to be made or received by the MS 101, e.g. based upon the seniority or job function of the person using the MS 101;

(vi) Data transfer capacity: this indicates the capacity or throughput of data, e.g. text, numeric, picture or video data, which is allowed to be sent to or from the MS 101;

(vii) Networks authorisation: this indicates the identity of network(s) of the system 100 with which the MS 101 is permitted to register as visited network(s);

(viii) Group memberships: this indicates the identity of the group(s) ('talk group(s)') of MSs of which the MS 101 is a member and is permitted to join when a call amongst the group is established or is being established.

The service record produced in step 202 may include data in fields relating to a large number of service parameters, e.g. up to one hundred or more such parameters.

The service record may also include basic details such as the identity of the network 102 which as home network has produced the service record, a serial number of the service record issue and a date of the service record issue.

As noted above, a certificate MAC is produced by the home network 101, e.g. by the authentication processor 109. The certificate MAC is produced by carrying out a calculation procedure in which the data comprising the service record, e.g. the entire contents of the service record, or at least the main contents of the service record, and the MAC key together provide inputs to the calculation procedure. The certificate MAC is an output of the calculation procedure. There are a many known forms of MAC calculation procedures or algorithms which are known per se and such known procedures may be used in the method 200. Typically such procedures apply a defined mathematical operation to combine the data of the service record with the data of the MAC key. The mathematical operation may for example include various data multiplication and re-arrangement steps. The calculation procedure may for example be a published standard MAC algorithm such as the SHA 256 algorithm or a similar standard MAC algorithm. The resulting MAC produced by the calculation is different for any difference in service record data, even if the difference is a minute one. Suitably, the MAC key used in the calculation procedure is a number which has been randomly or pseudo-randomly generated by the key issuing terminal 123.

The certificate MAC calculated by the home network 102 thus has a value which protects both the integrity as well as the authenticity of the data of the service record from which it is calculated. The service record can thus be authenticated by allowing any verifier, particularly the visited network 102, which also possesses the MAC key and the calculation procedure used by the home network 102, also to calculate the MAC as an authentication MAC and to match the authentication MAC with the certificate MAC applied by the home network 102. The verifier will be able to detect any unauthorised changes to the data content of the service record by finding that the authentication MAC and the certificate MAC do not match.

Optionally, the service record may itself be encrypted using an encryption key and an encryption algorithm in a known manner. The encryption key may comprise the MAC key or another key, e.g. issued by the key issuing terminal 123.

The certificate MAC produced by the calculation procedure is added to the service record from which it is calculated in step 202 of the method 200.

In a step 203 of the method 200, the home network 102 sends the certified service record, including the service record and the certificate MAC calculated from it, obtained in step 202 to the MS 101. The certified service record may be sent to the MS 101 in step 203 when the MS next has a normal wireless connection to the network 102 by registration in a conventional way via the base station 107. The MS 101 receives the certified service record by wireless communication from the base station 107 to the transceiver 104 of the MS.

In a step 204, the MS 101, controlled by the processor 105, stores the certified service record sent in step 203 in its memory 106. Where the MS 101 has an earlier version of the service record already stored in its memory 106, the later version sent in step 203 may replace that already stored.

Preferably, the MS 101 does not itself have the MAC key issued by the terminal 123 so is not itself able to operate the MAC calculation procedure.

In a step 208, usually at the same time as step 201, the visited network 103 receives via the link 127 and stores in the memory 120 the latest version of the MAC key issued by the key issuing terminal 123. The MAC key received in step 208 is intended to be the same key which has been used by the home network 102 in step 202 to calculate the certificate MAC. Step 208 may be carried out at the same time as the receipt of the latest version of the MAC key by the home network 102. However, in some cases the MAC key held by the visited network 103 may be an earlier or later version of the MAC key compared with that used by the home network 102 to operate the calculation procedure to produce the certificate code in step 202.

Some time after step 204, the MS 101 is in a region covered by the visited network 103. In a step 205, the MS 101 requests registration by the visited network 103. Communication between the MS 101 and the visited network 103 is carried out between the transceiver 104 of the MS 101 and the base station 113 of the visited network 103.

In a step 207, the MS 101 retrieves from the memory 106 its certified service record stored in step 203 and sends the retrieved certified service record, comprising the service record and the certificate MAC calculated from it by the home network 102, to the visited network 103. Step 207 may follow step 205 as shown in FIG. 2, although it could form part of step 205, or even precede step 205.

In a step 209, which is carried out by the visited network 103 in response to receiving the certified service record in step 207, the visited network 103 retrieves the latest version of the MAC key stored in its memory 120. The latest version of the MAC key is that received and stored in step 208.

In a step 211, the visited network 103, e.g. by the authentication processor 119, calculates an authentication MAC for the service record received from the MS 101. In order to give authentication of the service record, the authentication MAC is intended to be the same as the certificate MAC of the service record received from the MS 101. Thus, in order to produce the authentication MAC the visited network 103 carries out the same calculation procedure that was carried out by the home network 103 to produce the certificate MAC. For the calculation procedure, the visited network 103 uses as inputs the MAC key retrieved in step 209 and the service record sent by the MS 101 in step 207. Where the service record has been encrypted, the visited network 103 decrypts the service record (using the same encryption key and a decryption algorithm corresponding to the encryption algorithm used by the network 102) before carrying out step 211.

In a step 212, the visited network 103, e.g. by the authentication processor 119, compares the authentication MAC of the service record which has been calculated in step 211 with the certificate MAC that has been received with the service record from the MS 101. By matching the calculated authentication MAC with the certificate MAC received from the MS 101, the visited network 103, e.g. by the authentication processor 119, is able to determine that the service record received from the MS 101 is authentic and up to date. In response to successful matching of the MACs in step 212 to give authentication of the service record from which the MACs are calculated, the visited network 103, e.g. by the authentication processor 119, registers, in a step 213, the MS 101 and stores details of the authenticated service record of the MS 101 in the visitor location register 122. Finally, in a step 215, the visited network 103 provides communication services to the MS 101 in accordance with the authenticated service record. Communication between the MS 101 and the network 103 takes place between the transceiver 104 and the base station 113 (or another base station of the visited network 103) for as long as the MS 101 is in the region of the visited network 103 and is registered with the visited network 103.

When the visited network 103 calculates the authentication MAC in step 211, it may happen that the visited network 103 is unable to match the calculated authentication MAC with the certificate MAC received from the MS 101, as indicated in a step 217 following step 211. In response to step 217, the visited network 103, e.g. by the authentication processor 119, retrieves from the memory 120 in a step 219 an earlier version of the MAC key, i.e. the version received prior to that retrieved in step 209.

The earlier version of the MAC key retrieved in step 219 may be the same as the MAC key employed by the home network 102 in step 201 to calculate the MAC provided to the MS 101 and by the MS 101 to the network 103. In that case, steps 212, 213 and 215 may follow successfully.

If following step 219 a match for the calculated authentication MAC is still not obtained, step 219 may be repeated one or more times using other even earlier stored MAC keys.

If however, the visited network 103 is still unable to obtain a match for the calculated authentication MAC, as indicated in a step 221, the registration of the MS 101 may be deemed to have failed, as indicated by a step 223.

Following its request for registration in step 205, the MS 101 is able to obtain authentication and registration by the visited network 103 and communication services from the visited network 103 by provision of information in the form of the certified service record from the MS 101 to the visited network 103. Thus, use of the method 200 in the system 100 beneficially allows the authentication and registration of the MS 101 by the visited network 103, or any other MS with a visited network, without direct communication between the visited network, e.g. the network 103, and the home network, e.g. the network 102, at the time the MS 101 or other MS requests registration.

Although communication between the home network 102 and the visited network 103 via the link 115 may be necessary for some purposes, the method 200 provides a secure and trusted way in which the visited network 103 may determine what communication services should be provided to the MS 101 and to provide such services to the MS 101 without the immediate need for communication with the home network 102. The method 200 may be particularly useful, for example, if the link 115 between the networks 102 and 103 is unavailable owing to a fault or failure or is congested owing to a high volume of traffic on the link 115.

Furthermore, by avoiding communication between the visited network 103 and the home network 102 when the MS 101 sends a registration request to the visited network 101, it is possible to provide registration more quickly (than when such communication is used, as in the prior art). This may be important in an emergency operation in which it is essential for the MS 101 to obtain registration and provision of communication services as soon as possible.

Furthermore, by avoiding communication between the visited network 103 and the home network 102 when the MS 101 or another MS sends a registration request, it is possible beneficially to reduce the volume of system control traffic sent between the two networks.

The system 100 in which the method 200 is applied may be a system in which communication services provided to mobile stations have to be carefully controlled, e.g. because the users operate in an organisation in which security of communications has to be maintained. The organisation of the users of the system 100 may for example be a police or other public safety services organisation. The system 100 may be a TETRA system, an APCO 25 system or another system designed for use in such an organisation.

The invention claimed is:

1. A method of operation in a mobile communication system comprising the steps of: A mobile station receiving a certified service record from its home network and storing the certified service record, the certified service record including a service record and a certificate code, the service record indicating, as determined by the home network, types of communications services permitted to be provided to the mobile station by a visited network when the mobile station roams to a visited network, and the certificate code being a code generated by a calculation procedure applied to a contents of the service record using an authentication key and used for authenticating the service record; and the authentication key is being retrieved from a key issuing terminal; the mobile station roaming from its home network to a first visited network and sending to the first visited network the certified service record so that the visited network may know the types of communication services it is permitted to provide to the mobile station, the visited network determining if the service record provided by the mobile station is authentic by: separately calculating an authentication code for the service record received from the mobile station using the authentication key obtained by the visited network from the key issuing terminal; the visited network authenticating the received service record by determining whether the separately calculated authentication code matches the certificate code received from the mobile station; and if the visited network determines that the service record is authentic, the visited network providing communication services to the mobile station as a function of the types of communication services in the service record.

2. The method according to claim 1, wherein the mobile station retrieves the certified service record from its memory and sends the certified service record in association with a request for communication services from the visited network.

3. The method according to claim 1, wherein the visited network retrieves the authentication key from its memory.

4. The method according to claim 1, further comprising the visited network obtaining the authentication key from a key issuing terminal and the home network obtaining the same authentication key from the key issuing terminal for use in calculation of the certificate code by the home network.

5. The method according to claim 4, wherein the key issuing terminal is in the home network.

6. The method according to claim 2, further comprising the visited network receiving and storing the authentication key prior to the request from the mobile station and then responsive to receiving the request, the visited network determining if the service record provided by the mobile station in the request is authentic by:
(i) retrieving the stored authentication key;
(ii) carrying out the calculation procedure to calculate the authentication code using the retrieved key and the received service record;
(iii) comparing the calculated authentication code with the certificate code received from the mobile station; and
(iv) providing communication services to the mobile station as a function of the types of communication services indicated in the service record where the calculated authentication code and the received certificate code match;
wherein steps (i)-(iv) are completed without the visited network communicating with the home network.

7. The method according to claim 6, wherein when the visited network is unable to find a match between the certificate code received from the mobile station and the authentication code which it has separately calculated using the stored authentication key stored by the visited network, the visited network retrieves a prior stored authentication key received earlier than the stored authentication key; and carries out at least one further calculation procedure using the prior stored authentication key in order to find a second calculated authentication code that matches the certificate code received from the mobile station.

8. The method according to claim 1, further comprising the home network producing a certificate code of the service record by carrying out a calculation procedure using a latest received authentication key received from a key issuing terminal and the service record, appending the certificate code to the service record to produce the certified service record, and sending the certified service record to the mobile station by wireless communication.

9. The method according to claim 1, wherein the types of communication services comprise one or more of the following:
(i) Half/full duplex capability indicating whether the mobile station is allowed to participate in half or full duplex calls within the system;
(ii) Encryption capability indicating whether the mobile station is allowed to transmit or receive encrypted wireless communications and the level or type of encryption security to be applied;
(iii) Priority level indicating what priority level is allowed for calls to be made or received by the mobile station;
(iv) Data transfer capacity indicating a capacity or throughput of data which is allowed to be sent to or from the mobile station;
(v) Networks authorization indicating the identity of a network or networks of the system with which the mobile station is permitted to register as a visited network;
(vi) Group memberships indicating the identity of the group or groups of mobile stations of which the mobile station is a member and is permitted to join when a call amongst the group is established or is being established.

10. A mobile communication system comprising:
a mobile station;
a first network wirelessly serving the mobile station as a home network when the mobile station is within the vicinity of the home network;
a second network serving the mobile station as a visited network when the mobile station is within the vicinity of the visited network, and
wherein the mobile station is configured to receive from the home network a certified service record of communication services, the certified service record including a service record and a certificate code, the service record indicating, as determined by the home network, types of communications services permitted to be provided to the mobile station by a visited network when the mobile station roams to a visited network, and the certificate code being a code generated by a calculation procedure applied to a contents of the service record, the mobile station storing the certified service record in its memory; and the authentication key is being retrieved from a key issuing terminal;
wherein the mobile station is further configured to, in response to the mobile station roaming from the home network to the visited network, retrieve the certified service record from its memory and communicate the certified service record to the visited network so that the visited network may know the types of communication services it is permitted to provide to the mobile station;
wherein the visited network is configured to provide communication services to the mobile station as a function of the types of communication services indicated in the service record in response to the visited network receiving the certified service record and authenticating the service record by calculating an authentication code using the received service record and an authentication key, obtained from key issuing terminal and held by the visited network, and matching the calculated authentication code with the certificate code sent by the mobile station.

11. The mobile communication system of claim 10, wherein the mobile communication system comprises a TERA system or an APCO 25 system.

* * * * *